(12) United States Patent

Happy

(10) Patent No.: US 12,662,085 B2

(45) Date of Patent: Jun. 23, 2026

(54) VEHICLE SPOILER ASSEMBLY

(71) Applicant: NISSAN NORTH AMERICA, INC., Franklin, TN (US)

(72) Inventor: Kyle Happy, Whitmore Lake, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 0 days.

(21) Appl. No.: 18/346,032

(22) Filed: Jun. 30, 2023

(65) Prior Publication Data

US 2025/0001974 A1 Jan. 2, 2025

(51) Int. Cl.
B60S 1/04 (2006.01)
B62D 35/00 (2006.01)

(52) U.S. Cl.
CPC ............. B60S 1/043 (2013.01); B60S 1/0452 (2013.01); B62D 35/007 (2013.01)

(58) Field of Classification Search
CPC ........ B60S 1/0402; B60S 1/0405; B60S 1/58; B60S 1/583
USPC ...................................... 15/250.16
See application file for complete search history.

(56) References Cited

U.S. PATENT DOCUMENTS

| 6,193,302 B1 | 2/2001 | Won et al. | |
| 7,854,467 B2 * | 12/2010 | McKnight | B64C 23/00 296/180.1 |
| 9,802,657 B2 | 10/2017 | Oxley et al. | |

FOREIGN PATENT DOCUMENTS

| DE | 3206173 A | * | 8/1983 | ............... B60S 1/34 |
| DE | 3226578 A1 | * | 1/1984 | |
| DE | 3226578 C2 | * | 1/1991 | ............... B60S 1/34 |
| DE | 4338097 A1 | * | 5/1995 | .......... B62D 35/007 |
| DE | 102008026131 A1 | * | 12/2008 | .......... B60S 1/0402 |
| EP | 3269913 A1 | | 1/2018 | |
| JP | 60135353 A | * | 7/1985 | |
| JP | 61085246 A | * | 4/1986 | |
| JP | 61157426 A | * | 7/1986 | |
| JP | 2005350005 A | * | 12/2005 | |

OTHER PUBLICATIONS

Machine language translation of description portion of Japanese publication 60-135353, published Jul. 1985. (Year: 1985).*
Machine language translation of description portion of German publication 4338087, published May 1995. (Year: 1995).*

* cited by examiner

*Primary Examiner* — Katina N. Henson
(74) *Attorney, Agent, or Firm* — Spencer Fane, LLP

(57) ABSTRACT

A vehicle spoiler assembly includes a vehicle body structure having a rear window, a rear wiper assembly and a spoiler. The rear wiper apparatus has a motor and a wiper blade arm installed to the vehicle body structure above the rear window. The motor is operable to move the wiper blade arm between a stowed orientation and rear window wiping position such that during movement between the stowed orientation and the rear window wiping position the wiper blade arm moves over and wipes a majority of an outer surface of the rear window. The spoiler attached to the vehicle body structure covers the motor of the rear wiper apparatus and the wiper blade arm with the wiper blade arm in the stowed orientation, at least a portion of the spoiler is configured to access the motor of the rear wiper apparatus.

15 Claims, 5 Drawing Sheets

VEHICLE SPOILER ASSEMBLY

BACKGROUND

Technical Field

The present disclosure generally relates to a vehicle spoiler assembly. More specifically, the present disclosure relates to a vehicle spoiler assembly that is installed to a rear area of a vehicle covering a wiper motor that is located above a rear window.

Background Information

Many vehicles include a wiper apparatus installed beneath a rear window of a vehicle.

SUMMARY

One object of the present disclosure is to provide a vehicle with a wiper apparatus that is installed to a rear of a vehicle above a rear window with the wiper apparatus being at least partially concealed by a spoiler assembly with the spoiler assembly being configured to allow access to the wiper apparatus.

In view of the state of the known technology, one aspect of the present disclosure is to provide a vehicle spoiler assembly with a vehicle body structure having a rear window, a rear wiper assembly and a spoiler. The rear wiper apparatus has a motor and a wiper blade arm installed to the vehicle body structure above the rear window. The motor is operable to move the wiper blade arm between a stowed orientation and rear window wiping position such that during movement between the stowed orientation and the rear window wiping position the wiper blade arm moves over and wipes a majority of an outer surface of the rear window. The spoiler attached to the vehicle body structure covers the motor of the rear wiper apparatus and the wiper blade arm with the wiper blade arm in the stowed orientation, at least a portion of the spoiler is configured to access the motor of the rear wiper apparatus.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
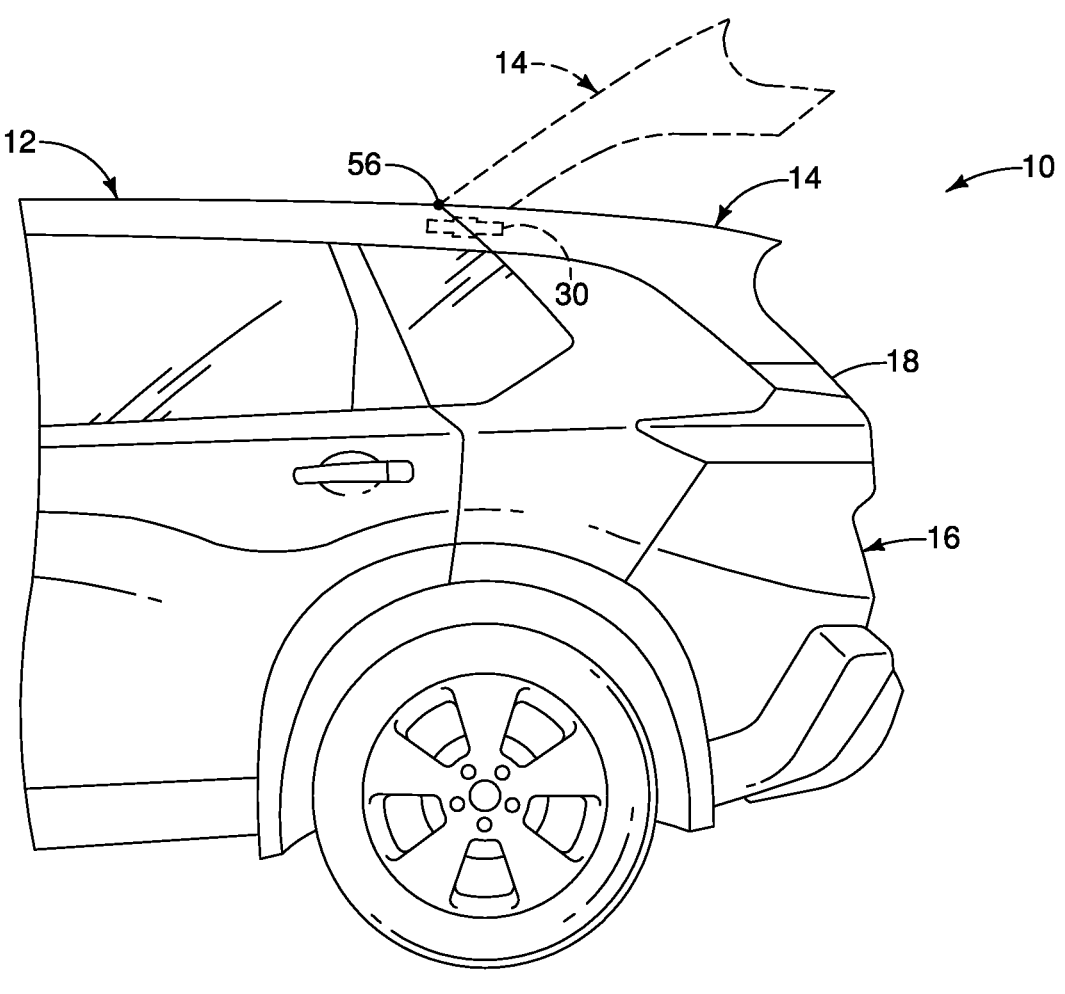
FIG. 1 is a side view of a rearward portion of a vehicle that has a rear door with a spoiler assembly and a wiper apparatus, with the wiper apparatus and the spoiler being located above a rear window, the spoiler assembly shown in a closed orientation at least partially concealing the wiper assembly in accordance with a first embodiment.

Referring initially to FIG. 1, a vehicle 10 having a vehicle body structure 12 is illustrated in accordance with a first embodiment. The vehicle body structure 12 includes a vehicle spoiler assembly 14, described further below. The vehicle body structure 12 also includes a rear door 16 (also referred to as a cargo door 16) provided with a window 18 and a wiper apparatus 20 (FIG. 2).

Figure 2:
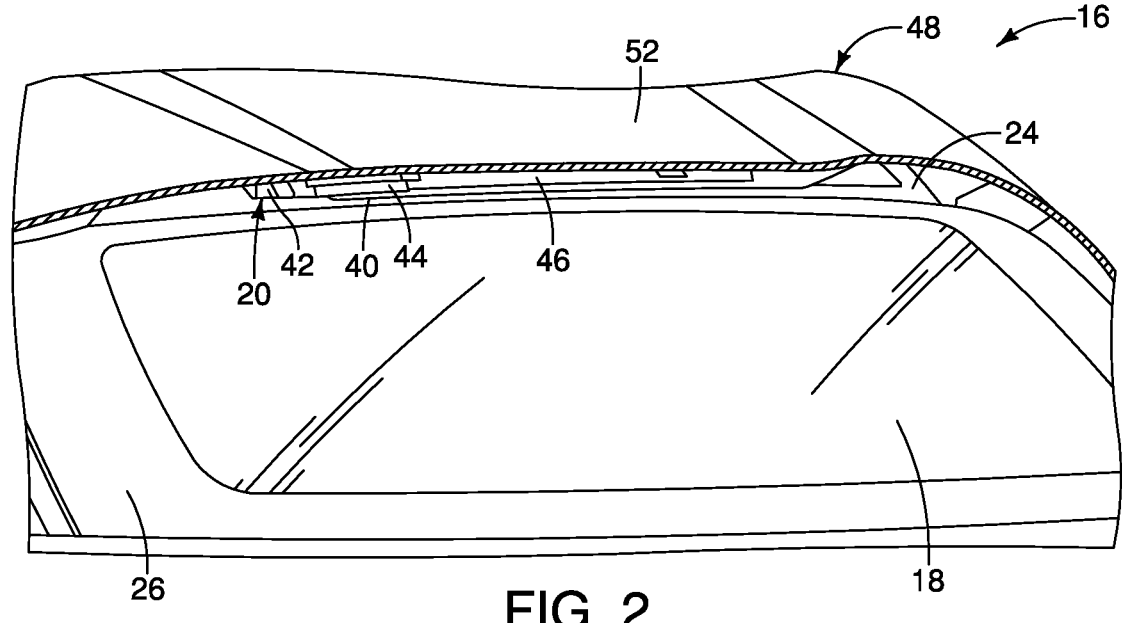
FIG. 2 is a rear cross-sectional perspective view of the rear of the vehicle showing a portion of the rear door and the window with the spoiler assembly partially cut away, the spoiler assembly at least partially concealing the wiper apparatus in accordance with the first embodiment.

As shown in FIG. 2, the rear door 16 includes an upper structure 24 and a lower structure 26 with the window 16 being installed to the lower structure 26. The upper structure 24 and the lower structure 26 are rigidly fixed to one another for movement as a single monolithic structure. As shown in FIG. 1, the rear door 16 is pivotally attached to the vehicle body structure 12 by hinges 30 for movement between a closed orientation (shown in FIG. 1) and an open orientation (not shown). The hinges 30 are attached to the upper structure 24 of the rear door 16, as shown in FIG. 2. Since movement of a rear door of a vehicle about hinges is a conventional feature/function, further description is omitted for the sake of brevity.

As is shown in FIG. 2, the wiper apparatus 20 is installed to the upper structure 24 of the rear door 16. The wiper apparatus 20 includes a support structure 40, a motor 42 and a wiper arm 44 with a wiper blade 46. The wiper apparatus 20 operates in a conventional manner with the motor 42 pivoting the wiper arm 44 between a stowed orientation (solid lines in FIG. 2) and rear window wiping positions as indicated by arrow A in FIG. 3).

In the stowed orientation, the wiper arm 44 and wiper blade 46 are pivoted upward and are concealed beneath the spoiler assembly 14. In the rear window wiping positions, the wiper arm 44 and the wiper blade 46 sweep across the window 18 removing rain and debris. The motor 42 is operable to move the wiper arm 44 and blade 46 between the stowed orientation and rear window wiping positions such that during movement between the stowed orientation and the rear window wiping positions the wiper arm 44 and blade 46 move over and wipe a majority of an outer surface of the rear window 18.

The vehicle spoiler assembly 14 (hereinafter referred to as the spoiler assembly 14) can be made of any of a variety of materials, such as fiberglass/resin, plastic, polymers, or any other light weight material that provides rigidity and strength suitable for a vehicle spoiler. The spoiler assembly 14 is preferably manufactured as a single element but alternatively can be manufactured as a plurality of contoured panel-like elements with specific shapes and contours that are fixed to one another to define the spoiler assembly 14 as depicted in the drawings.

The spoiler assembly 14 is attached to the rear door 16 of the vehicle body structure 12 covering the motor 42, the wiper arm 44 and the wiper blade 46 of the rear wiper apparatus 20 with the wiper blade arm in the stowed orientation.

The spoiler assembly 14 is shaped and configured to allow access the motor 42, the wiper arm 44 and the wiper blade 46 of the rear wiper apparatus 20 in a manner described below.

The spoiler apparatus 14 has a main body 48 that includes a rearward extending section 50 and a forward section 52. The spoiler apparatus 14 further includes an attachment panel 54 and a hinge section 56. The rearward extending section 50 overhangs an upper forward area of the rear window 18 rearward of the motor 42.

In FIG. 2, the rearward extending section 50 has been cutaway showing the wiper apparatus 20 concealed under the spoiler apparatus 14. The rearward extending section 50 overhangs the window 18 but does not contact the window 18. Therefore, the gap depicted in FIG. 2 between the upper structure 24 of the rear door 16 and the forward section 52 of the spoiler assembly 14 allows for freedom of movement of the wiper arm 44 and wiper blade 46 between the stowed orientation and rear window wiping positions.

Figure 3:
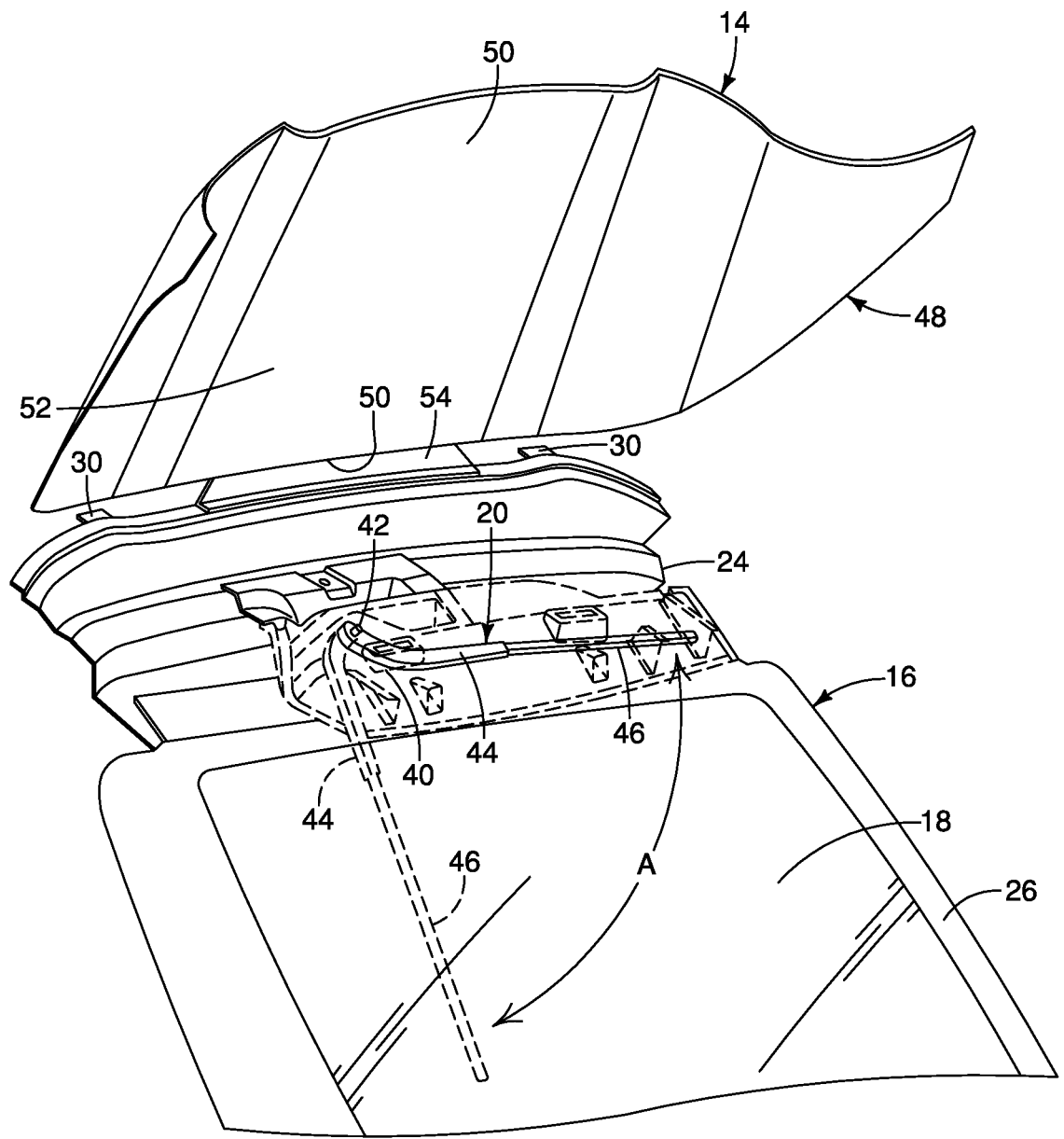
FIG. 3 is a perspective view of the rear door removed from the vehicle showing an upper structure and lower structure of the rear door, the window installed to the lower structure of the rear door, the wiper assembly installed to the upper structure of the rear door and the spoiler assembly pivoted about a hinge portion fully exposing the wiper apparatus in accordance with the first embodiment.

As shown in FIG. 3, the attachment panel 54 attaches to the upper structure 24 of the rear door 16 via, for example, mechanical fasteners (not shown). The attachment panel 54 is formed with the main body 48 of the spoiler assembly 14 as a single, unitary, monolithic structure. The attachment panel 54 is basically attached to the main body 48 by the hinge section 56. The hinge section 56 is preferably a living hinge that is defined by, for example, a thickness of the attachment panel 54 being reduced to define the hinge section 56. Alternatively, the attachment panel 54 can be attached to the main body 48 with a mechanical hinge (not shown) that attaches to the attachment panel 54 and the main body 48.

The attachment panel 54 is attached to the forward most part of the upper structure 24 of the rear door 16 of the vehicle body structure 12. Further, the hinge section 56 is located along a forward portion and upper portion of the attachment panel 54. Hence, the attachment panel 54 itself is non-movably attached to the rear door 16 with the hinge section 56 being pivotable relative to the attachment portion 54.

Figure 4:
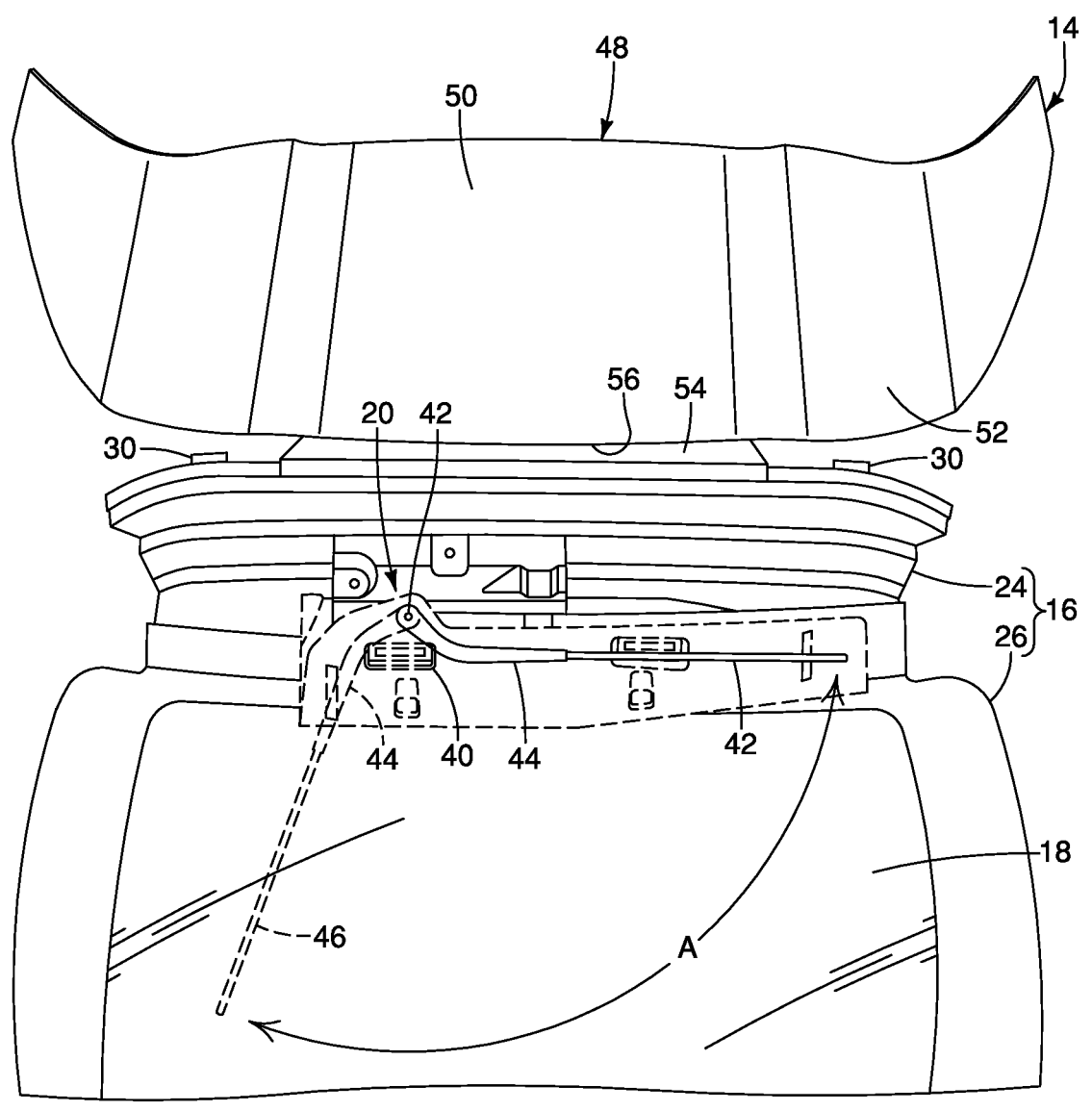
FIG. 4 is a rear view of the rear door removed from the vehicle showing the upper structure and the lower structure of the rear door, the window installed to the lower structure of the rear door, the wiper assembly installed to the upper structure of the rear door and the spoiler assembly pivoted about the hinge portion fully exposing the wiper apparatus in accordance with the first embodiment.

As shown in FIG. 1, the spoiler assembly 14 is pivotable about the hinge section 56 from a fixed close position or closed orientation (solid lines in FIG. 1) to an open position or open orientation (in phantom lines in FIG. 1) exposing the wiper apparatus 20, as shown in FIGS. 3 and 4. With the spoiler assembly 14 in the open position, a vehicle operator or technician can access the wiper apparatus 20 in order to repair the wiper apparatus 20 and/or replace the wiper blade 46.

The rearward extending section 50 and optionally areas of the forward section 50 of the spoiler assembly 14 are releasably attach to the rear door 16 maintaining the spoiler assembly 14 in the closed position via conventional mechanical fasteners (not shown). When the conventional mechanical fasteners are removed, the spoiler assembly 14 can be easily pivoted from the closed position to the open position.

Second Embodiment

Figure 5:
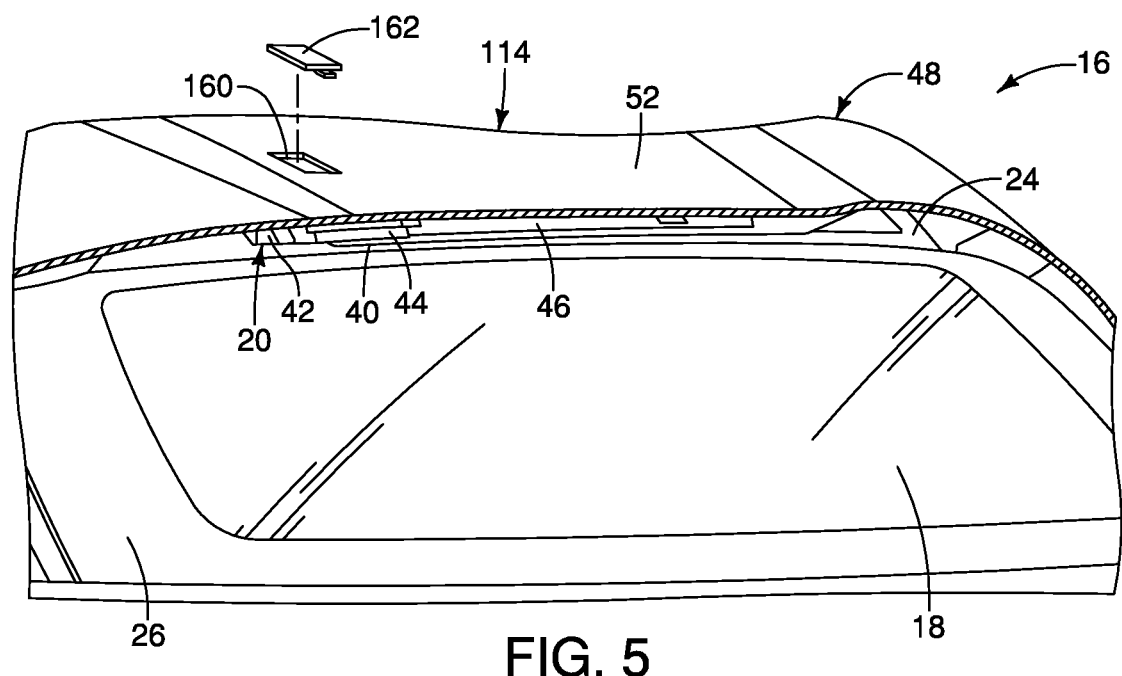
FIG. 5 is a rear cross-sectional perspective view of a rear of a vehicle showing a portion of a rear door and a window with a spoiler assembly partially cut away, the spoiler assembly at least partially concealing a wiper apparatus, the spoiler assembly being provided with an access opening that allows access to the wiper apparatus 20 and a cover that fits into the access opening in accordance with a second embodiment.
Figure 6:
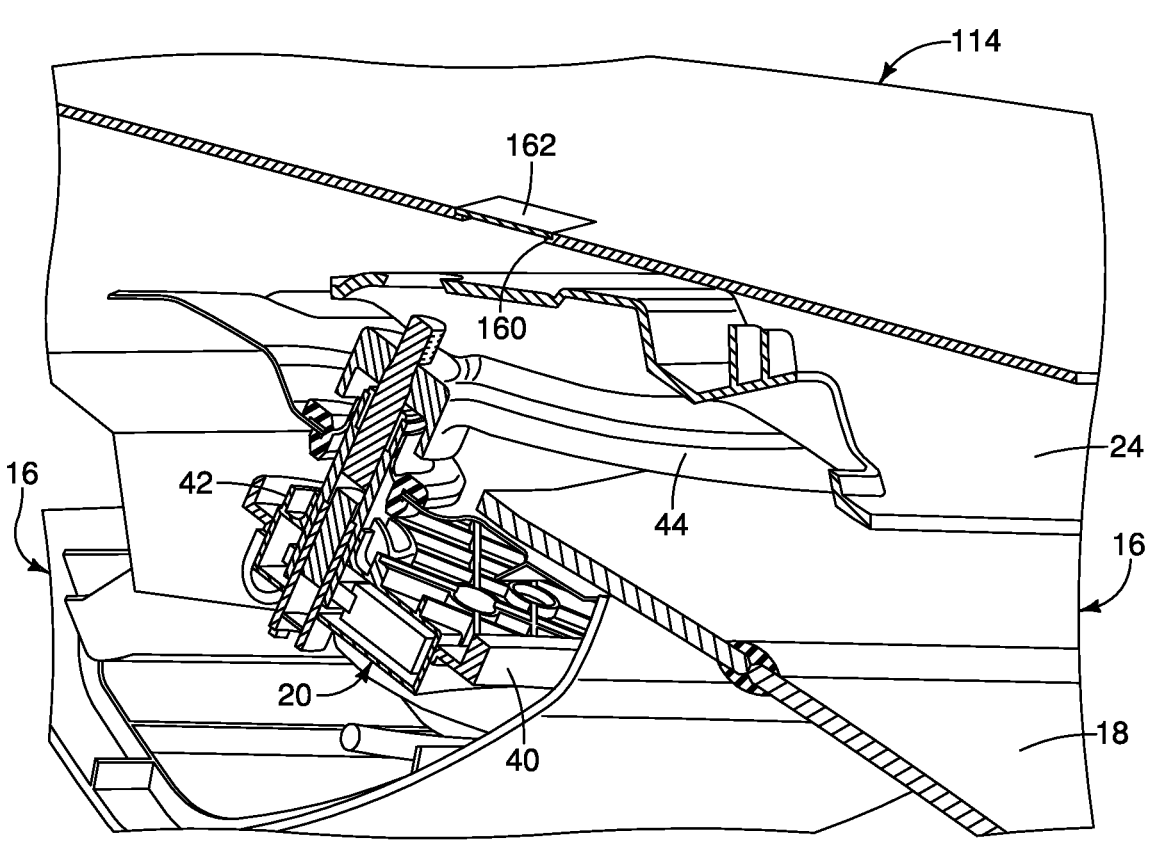
FIG. 6 is a cross-sectional view of a portion of the rear door, the wiper apparatus and the spoiler assembly depicted in FIG. 5 in accordance with the second embodiment.
Figure 7:
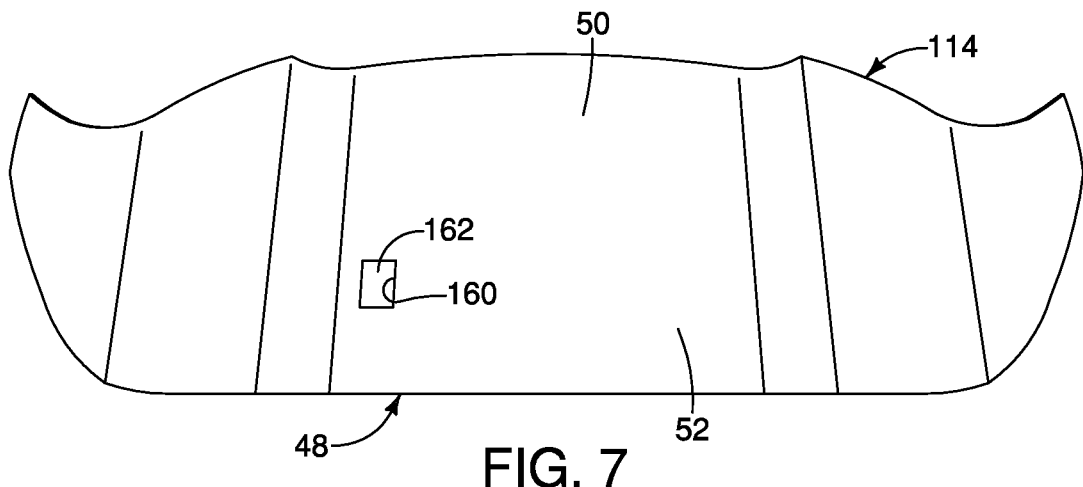
FIG. 7 is a bottom view of the spoiler assembly removed from the rear door showing the access opening and the cover in accordance with the second embodiment.

Referring now to FIGS. 5-7, a spoiler assembly 114 is shown with features of the rear door 16 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the second embodiment, the rear door 16 is basically identical to the rear door 16 of the first embodiment. Specifically, the rear door 16 includes the window 18, the wiper apparatus 20, the upper structure 24, the lower structure 26 and the hinges 30.

The spoiler assembly 114 includes the main body 48, the rearward section 50 and the forward section 52. However, the spoiler assembly 114 does not include the attachment panel 54 or the hinge section 56 of the first embodiment.

Instead of being attached to the rear door 16 via a hinge, the spoiler assembly 114 is fixed to the rear door 16 via mechanical fasteners and/or adhesive materials (not shown). In order to access portions of the wiper apparatus 20, such as the motor 42 and the wiper arm 44, the forward section 52 of the spoiler assembly 14 is provided with an access opening 160 and removable cover 162, as shown in FIGS. 5-7. Essentially, the spoiler assembly 114 is non-movably fixed to the rear door 16 of the vehicle body structure 12.

Third Embodiment

Figure 8:
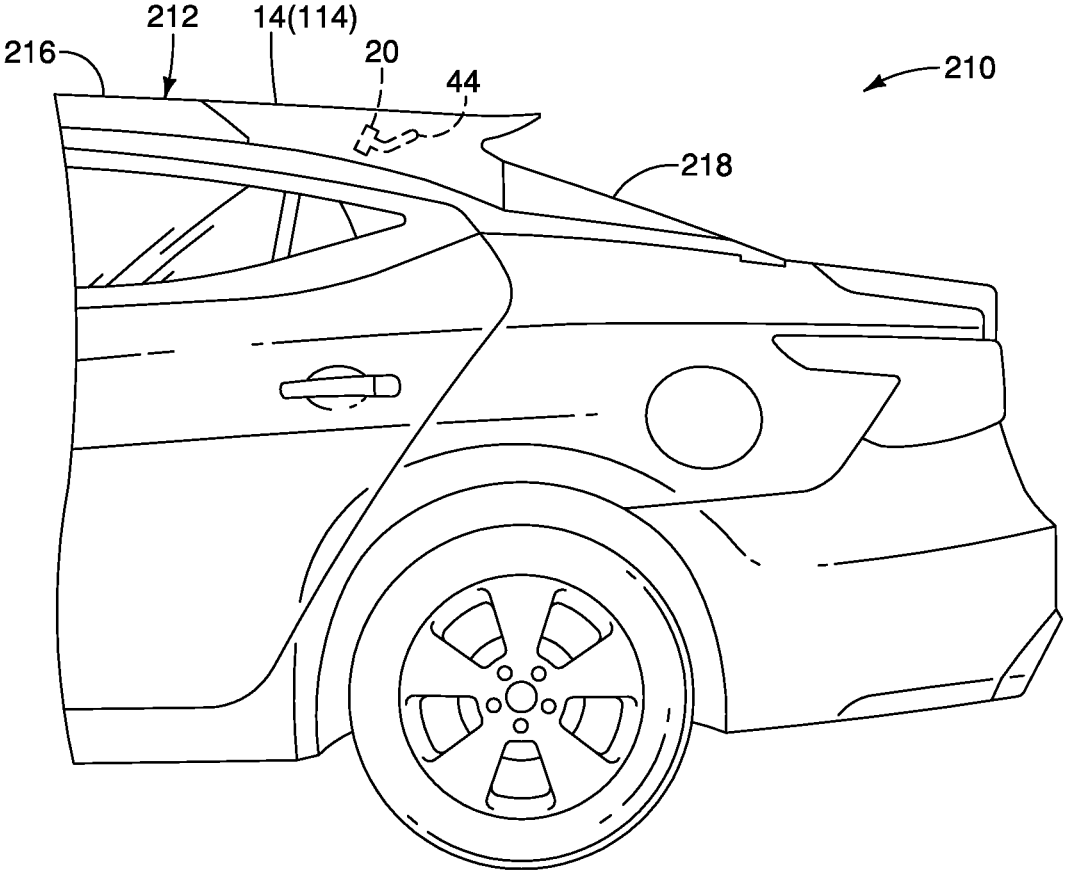
FIG. 8 is a rear view of a vehicle having a spoiler assembly in accordance with a third embodiment.

Referring now to FIG. 8, a vehicle 210 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

In the third embodiment, the vehicle 210 includes a vehicle body structure 212 with a roof structure 216 and a rear window 218. Either one of the spoiler assembly 14 (first embodiment) or the spoiler assembly 114 (second embodiment) can be installed to a rearward area of the roof structure 216 such that the spoiler assembly 14 or the spoiler assembly 114 covers and at least partially conceals the wiper apparatus 20 and wiper arm 44 (shown in phantom in FIG. 8).

In the third embodiment, with either of the spoiler assembly 14 or the spoiler assembly 114 installed to the vehicle 210, the wiper apparatus 20 operates to sweep along the surface of the rear window 114 unobstructed by the spoiler assembly 14 or the spoiler assembly 114. If the spoiler assembly 14 is installed to the vehicle, as described above in the first embodiment, the spoiler assembly 14 pivots upward providing access to the wiper apparatus 20 for maintenance or blade replacement. If the spoiler assembly 114 is installed to the vehicle, as described above in the second embodiment, the access panel of the spoiler assembly 114 can be removed providing access to the wiper apparatus 20 for maintenance or blade replacement.

The vehicle body structure 12 includes many conventional components that are well known in the art, and not necessarily described above. Since these conventional components are well known in the art, these structures will not be discussed or illustrated in detail herein. Rather, it will be apparent to those skilled in the art from this disclosure that the components can be any type of structure and/or programming that can be used to carry out the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle spoiler assembly. Accordingly, these terms, as utilized to describe the present invention should be interpreted relative to a vehicle equipped with the vehicle spoiler assembly.

The term "configured" as used herein to describe a component, section or part of a device that is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle spoiler assembly, comprising:
a vehicle body structure having a rear window;

a rear wiper apparatus having a motor and a wiper blade arm installed to the vehicle body structure above the rear window, the motor being operable to move the wiper blade arm between a stowed orientation and rear window wiping position such that during movement between the stowed orientation and the rear window wiping position the wiper blade arm moves over and wipes a majority of an outer surface of the rear window; and a spoiler attached to the vehicle body structure covering the motor of the rear wiper apparatus and the wiper blade arm with the wiper blade arm in the stowed orientation, at least a portion of the spoiler being configured to access the motor of the rear wiper apparatus, the spoiler including a main body, an attachment panel and a hinge portion that connects the attachment panel to the main body;

the main body is detachably fixed to the vehicle body structure such that with the main body detached from the vehicle body structure, the main body pivots upward about the hinge portion.

2. The vehicle spoiler assembly according to claim 1, wherein the spoiler includes a rearward extending section that overhangs an area of the rear window rearward of the motor.

3. The vehicle spoiler assembly according to claim 1, wherein the spoiler includes an opening and a removable panel positioned above the motor of the rear wiper apparatus such that with the removable panel removed from the opening, the motor is accessible via the opening.

4. The vehicle spoiler assembly according to claim 3, wherein the spoiler is non-movably fixed to the vehicle body structure.

5. The vehicle spoiler assembly according to claim 1, wherein the vehicle body structure includes a rear door that is movable between a closed position to an open position relative to a rear area of the vehicle body structure, the rear wiper apparatus and the spoiler being fixed to an upper area of the rear door and the rear window being installed to the rear door.

6. The vehicle spoiler assembly according to claim 1, wherein the vehicle body structure includes a roof structure and a rear panel that extends rearward and downward from the roof structure, with the rear wiper apparatus and the spoiler being fixed to a rearward upper area of the roof structure and the rear window being installed to the panel that extends downward from the roof structure.

7. A vehicle spoiler assembly, comprising:
a vehicle body structure having a rear door with a rear window, the rear door being movable between a closed position to an open position relative to a rear area of the vehicle body structure;

a rear wiper apparatus having a motor and a wiper blade arm installed to the rear door above the rear window, the motor being installed so as to be accessible from an outside of the vehicle body structure and operable to move the wiper blade arm between a stowed orientation and rear window wiping position such that during movement between the stowed orientation and the rear window wiping position the wiper blade arm moves over and wipes a majority of an outer surface of the rear window; and a spoiler having a main body that is attached to an upper area of the rear door for pivoting movement relative to the rear door, the pivoting movement configured to move the spoiler away from the rear wiper apparatus to an open position providing access to and exposing the motor of the rear wiper apparatus and a closed position blocking access to the motor.

8. The vehicle spoiler assembly according to claim 7, wherein the spoiler includes an attachment panel and a hinge portion that connects the attachment panel to the main body.

9. The vehicle spoiler assembly according to claim 8, wherein the attachment panel is rigidly fixed to a rear portion of the vehicle body structure with the hinge portion being located along a forward portion of the attachment panel.

10. The vehicle spoiler assembly according to claim 8, wherein the hinge portion is a living hinge formed integrally with the main body and the attachment panel.

11. The vehicle spoiler assembly according to claim 7, wherein the spoiler includes a rearward extending section that overhangs an area of the rear window rearward of the motor.

12. The vehicle spoiler assembly according to claim 7, wherein the spoiler includes an opening and a removable panel positioned above the motor of the rear wiper apparatus such that with the removable panel removed from the opening, the motor is accessible via the opening.

13. The vehicle spoiler assembly according to claim 7, wherein the spoiler is non-movably fixed to the vehicle body structure.

14. The vehicle spoiler assembly according to claim 7, wherein the vehicle body structure includes a rear door that is movable between a closed position to an open position relative to a rear area of the vehicle body structure, the rear wiper apparatus and the spoiler being fixed to an upper area of the rear door and the rear window being installed to the rear door.

15. The vehicle spoiler assembly according to claim 7, wherein the vehicle body structure includes a roof structure and a rear panel that extends rearward and downward from the roof structure, with the rear wiper apparatus and the spoiler being fixed to a rearward upper area of the roof structure and the rear window being installed to the panel that extends downward from the roof structure.

\* \* \* \* \*